United States Patent
Oka (10) Patent No.: US 8,059,214 B2
(45) Date of Patent: Nov. 15, 2011

(54) DIRECT-TYPE BACKLIGHT DEVICE AND LIQUID CRYSTAL TELEVISION APPARATUS

(75) Inventor: Masaharu Oka, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1268 days.

(21) Appl. No.: 11/728,389

(22) Filed: Mar. 26, 2007

(65) Prior Publication Data
US 2007/0222905 A1    Sep. 27, 2007

(30) Foreign Application Priority Data
Mar. 27, 2006 (JP) ................. 2006-085311

(51) Int. Cl.
*H04N 5/64* (2006.01)
*H04N 3/14* (2006.01)

(52) U.S. Cl. ........ 348/790; 348/794; 348/795; 348/739; 348/798; 345/102; 345/87; 362/611; 362/614

(58) Field of Classification Search ............... 348/790, 348/795, 739, 794, 798; 362/29, 225, 611, 362/614; 345/102, 87
See application file for complete search history.

(56) References Cited

U.S. PATENT DOCUMENTS

| | | | |
|---|---|---|---|
| 2,864,939 A * | 12/1958 | Bodian et al. ................ | 362/222 |
| 6,000,982 A | 12/1999 | Nakamura et al. | |
| 6,201,352 B1 * | 3/2001 | Ge et al. ...................... | 315/169.1 |
| 2004/0257793 A1 * | 12/2004 | Wakabayashi ................ | 362/31 |
| 2005/0281037 A1 * | 12/2005 | Murakami et al. ........... | 362/382 |
| 2006/0002107 A1 | 1/2006 | Jeong | |

FOREIGN PATENT DOCUMENTS

| | | |
|---|---|---|
| EP | 1582913 | 10/2005 |
| EP | 1801638 | 6/2007 |
| JP | 2001-194664 | 7/2001 |
| JP | 2001-194664 A | 7/2001 |
| JP | 2002-082626 A | 3/2002 |
| JP | 2004-235092 A | 8/2004 |
| JP | 2004-327165 | 11/2004 |
| JP | 2005-302533 A | 10/2005 |
| JP | 2005-347062 | 12/2005 |

OTHER PUBLICATIONS

Japanese Notice of the reason for refusal, dated Aug. 6, 2008.
The extended European search report, pursuant to Rule 44a EPC dated Sep. 6, 2007, searched on Aug. 30, 2007.

* cited by examiner

*Primary Examiner* — Jefferey Harold
*Assistant Examiner* — Jean W Desir
(74) *Attorney, Agent, or Firm* — Yokoi & Co., U.S.A., Inc.; Toshiyuki Yokoi

(57) ABSTRACT

Fluorescent tubes are arranged such that their arrangement spaces gradually become wider in central area than in edge areas, fluorescent tubes located in the vicinity of the central area of an arrangement direction are bent into chevron-shapes such that the central parts of the longitudinal directions of the fluorescent tubes become crests which provide access to a diffusion plate, respective two adjacent fluorescent tubes which are straight tubes are connected to one another, thereby constituting pseudo U-shaped tubes, and an AC power is supplied through terminals lined up along one side of a direct-type backlight device. A reflector plate is bent so as to match with the curvature of the bent fluorescent tubes, and is formed with a protrusion which allows the fluorescent tubes located in the vicinity of the central area of the arrangement direction to be raised so as to protrude toward a diffusion plate.

10 Claims, 6 Drawing Sheets

DIRECT-TYPE BACKLIGHT DEVICE AND LIQUID CRYSTAL TELEVISION APPARATUS

CROSS-REFERENCES TO RELATED APPLICATIONS

The present application is related to the Japanese Patent Application No. 2006-085311, filed Mar. 27, 2006, the entire disclosure of which is expressly incorporated by reference herein.

BACKGROUND OF THE INVENTION (1) Field of the Invention

The present invention relates to a direct-type backlight device and a liquid crystal television apparatus and, more particularly, to a liquid crystal television apparatus employing the direct-type backlight device.

(2) Description of Related Art

Generally, in a display apparatus which is to be viewed away from a screen of the display apparatus, particularly, in a television apparatus or the like, a viewer's attention is prone to be concentrated on a central part of the screen. The viewer is prone to feel that image quality is excellent in a case where the central part of the screen is brighter than a peripheral part of the screen. In the light of this actual situation, the television apparatus is designed such that the peripheral part of the screen becomes dark about 30% as compared to the central part of the screen. Of course, this tendency also applies to a liquid crystal display apparatus and a liquid crystal television apparatus. Therefore, in a liquid crystal display apparatus or a liquid crystal television apparatus which employs a direct-type backlight device, if a backlight in which straight tubes are merely lined up is employed, the viewer is likely to be discontented with image quality.

In order to dissolve the discontent of the viewer, the idea that U-shaped tubes are arranged in face-to-face relationship with one another and raised at central parts thereof, whereby brightness in the central part of the screen is enhanced is previously employed. Moreover, Japanese Patent Application Laid-Open No. 2004-327165 discloses a light emitting device in which fluorescent tubes formed into W-shapes, fluorescent tubes, the number of bending of which is increased, or the like as well as U-shaped tubes are employed, thereby to allow an area in the vicinity of a central part of a light emitting surface of the light emitting device to become bright. Also, Japanese Patent Application Laid-Open No. 2005-347062 discloses a backlight device and a liquid crystal display device in which fluorescent tubes are arranged such that their arrangement spaces in the vicinity of a central area corresponding to a central part of a display screen become narrower than their arrangement spaces in a peripheral area corresponding to a peripheral part of the display screen, or fluorescent tubes in the vicinity of the central part of the display screen are arranged so as to come closer to a diffusion plate as compared with fluorescent tubes arranged at an area positionally corresponding to the peripheral part of the display screen, or a reflector plate having a chevron shape in cross-section which extends along longitudinal directions of the fluorescent tubes is arranged, whereby luminance in an area in the vicinity of the central part of the display screen is enhanced.

In the conventional art, an inverter drive method is realized by employing an inverter for each of the fluorescent tubes or by employing an inverter per two fluorescent tubes connected to each other, thereby constituting a pseudo W-shaped tube, according to the number of the fluorescent tubes to be used. When an inverter is employed for each of the fluorescent tubes, inverter substrates are required on the left and right and the number of inverters to be required is increased. On the other hand, when a pseudo W-shaped tube constituted by two U-shaped tubes is employed, there is a possibility that brightness unevenness is easy to occur in a central part and both ends of the W-shaped tube.

Moreover, in the technology disclosed in Japanese Patent Application Laid-Open No. 2004-327165, the shape of the fluorescent tube is special, so that an increase in cost is not avoided. Also, in the technology disclosed in Japanese Patent Application Laid-Open No. 2005-347062, attention is given to the longitudinal direction of the fluorescent tube but consideration of brightness unevenness in a width direction of the fluorescent tube is not taken.

BRIEF SUMMARY OF THE INVENTION

The present invention discloses a direct-type backlight device for a liquid crystal display apparatus or a liquid crystal television apparatus, in which luminance in an area in the vicinity of a central part of a light emitting surface is enhanced, to thereby make it hard for a user to feel brightness unevenness, when the user views the apparatus.

One aspect of the present invention provides a direct-type backlight device comprising: a diffusion plate arranged on a back of a liquid crystal display panel for irradiating diffused light upon the liquid crystal display panel; a plurality of fluorescent tubes arranged substantially in parallel on a back of the diffusion plate for irradiating light upon the back of the diffusion plate; and a reflector plate arranged on backs of the fluorescent tubes for reflecting light from the fluorescent tubes toward the diffusion plate, some of the fluorescent tubes are bent such that substantially central parts of longitudinal directions thereof of fluorescent tubes provide access to the diffusion plate.

According to the direct-type backlight device of the present invention which is constructed as discussed above, it is possible to cause brightness of lights emitted from the substantially central parts of the fluorescent tubes to become higher than brightness of lights emitted from end portions of the fluorescent tubes. Therefore, according to the present invention, it is possible to provide a direct-type backlight device which is employed in a liquid crystal display apparatus or a liquid crystal television apparatus, and facilitates making it hard for a user to feel brightness unevenness when the user views the apparatus. Only fluorescent tubes which are arranged in the vicinity of a substantially central area of the arrangement direction of the fluorescent tubes may be bent into chevron-shapes such that substantially central parts of longitudinal directions thereof become crests, and fluorescent tubes which are arranged in the vicinity of outer edge areas of the arrangement direction may be left straight. In this case, brightness of light emitted from a substantially central area of a screen in a vertical direction is enhanced, so that this structure is suitable.

One optional aspect of the present invention provides the direct-type backlight device, wherein the reflector plate is bent so as to match with a curvature of the bent fluorescent tubes.

Another optional aspect of the present invention provides the direct-type backlight device, wherein the fluorescent tubes are arranged such that their arrangement spaces gradually become wide from a substantially central area toward edge areas.

Another optional aspect of the present invention provides the direct-type backlight device, wherein the reflector plate is formed such that its substantially central area in the arrangement direction of the fluorescent tubes is raised toward the diffusion plate.

According to the embodiments of the present invention which are constructed as discussed above, it is possible to provide a direct-type backlight device which further facilitates making it hard for a user to feel brightness unevenness when the user views the apparatus.

Another optional aspect of the present invention provides the direct-type backlight device, wherein the reflector plate is designed so as to be able to be raised up to a height of one third or less of a space in which the fluorescent tubes are installed.

In the direct-type backlight device constructed in this way, horizontal stripes can be prevented from appearing on the display apparatus along the fluorescent tubes.

Another optional aspect of the present invention provides the direct-type backlight device, wherein the fluorescent tubes are straight tubes.

In the direct-type backlight device constructed in this way, the straight tubes are employed, so that central portions of the fluorescent tubes become brighter than end portions of the fluorescent tubes and the unit costs of the fluorescent tubes are lowered, thus leading to reduction of cost.

Another optional aspect of the present invention provides the direct-type backlight device, wherein the fluorescent tubes are U-shaped tubes.

In the direct-type backlight device constructed in this way, the U-shaped tubes are employed. Thus, there is provided a direct-type backlight device which facilitates making it hard for a user to feel brightness unevenness when the user views the apparatus.

Another optional aspect of the present invention provides the direct-type backlight device, wherein the fluorescent tubes are pseudo U-shaped tubes constituted by causing respective two adjacent straight-tubes to be connected to each other.

In the direct-type backlight device constructed in this way, U-shaped tubes are not employed and the pseudo U-shaped tube are used, so that central portions of the fluorescent tubes become brighter than end portions of the fluorescent tubes and it is possible to avoid the flicker of the fluorescent tubes which is brought about by unevenness of lengths of harnesses and excessively long lengths of the harnesses. Moreover, the straight tubes are employed, so that the unit costs of the fluorescent tubes are lowered, thus leading to reduction of cost.

Another aspect of the present invention provides a liquid crystal television apparatus for receiving a television broadcast and then allowing a corresponding image to be displayed on a screen, the liquid crystal television apparatus comprising: a liquid crystal display panel for displaying the image through the screen of the liquid crystal display; a direct-type backlight device including a diffusion plate arranged on a back of the liquid crystal display panel for irradiating diffused light upon the liquid crystal display panel, a plurality of cold-cathode tubes arranged substantially in parallel on a back of the diffusion plate for irradiating light upon the back of the diffusion plate, and a reflector plate arranged on backs of the cold-cathode tubes for reflecting the light from the cold-cathode tubes toward the diffusion plate; and an inverter section for supplying an alternating current voltage to the direct-type backlight device, the cold-cathode tubes are pseudo U-shaped tubes constituted by causing respective two adjacent straight-tubes to be connected to each other, and are adapted to receive the alternating current voltage from an inverter section through terminals lined up along one edge of the direct-type backlight device, and are arranged such that their arrangement spaces gradually become wide from a substantially central area toward edge areas; cold-cathode tubes that are arranged in the vicinity of the substantially central area of an arrangement direction of the cold-cathode tubes are bent into chevron-shapes such that substantially central parts of longitudinal directions of the cold-cathode tubes become crests which provide access to the diffusion plate; cold-cathode tubes that are arranged in the vicinity of outer end areas of the arrangement direction are left straight; and the reflector plate is bent so as to match with a curvature of the bent cold-cathode tubes, and is formed with a protrusion that allows the cold-cathode tubes in the vicinity of the substantially central area of the arrangement direction to be raised up so as to protrude toward the diffusion plate, the protrusion capable of being raised to a height of one third or less of a distance defined by the diffusion plate and the reflector plate.

It goes without saying that the liquid crystal television apparatus constructed as discussed above takes the same effects as the direct-type backlight device does.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Embodiments according to the present invention will be discussed in the following order.

(1) Schematic structure of a liquid crystal television apparatus;
(2) Structure of a direct-type backlight device; and
(3) Summary.

(1) Schematic Structure of a Liquid Crystal Television Apparatus:

A television according to an embodiment of the present invention will be discussed hereinafter.

Figure 1:
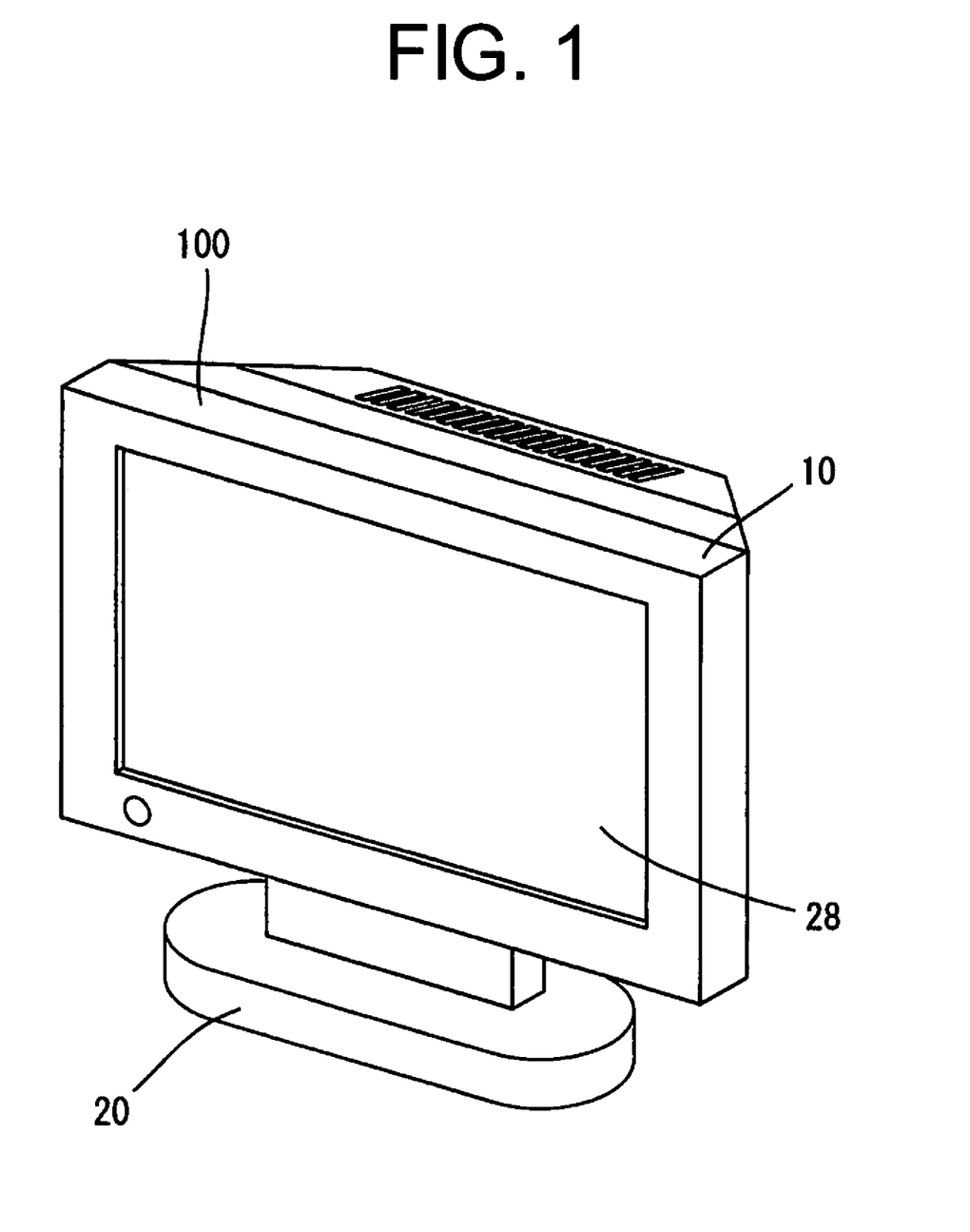
FIG. 1 is an exemplary illustration of an external view of a liquid crystal television apparatus according to an embodiment of the present invention.

FIG. 1 is a schematic perspective view of the television 100 as viewed from an oblique front. In the illustrated example, the television 100 comprises a cabinet 10, a liquid crystal display panel 28, and a leg portion 20. The liquid crystal display panel 28 is installed with a flat display face thereof for displaying an image on a screen facing the front. The cabinet 10 is made of resin and supports the display panel 28 in such a manner to allow the display face to be exposed to the front. A speaker (not shown) for outputting audio is installed in an interior of the cabinet. The leg portion 20 supports the cabinet 10 in such a manner that the display face of the liquid crystal panel 28 is oriented so as to substantially vertically stand.

Figure 2:
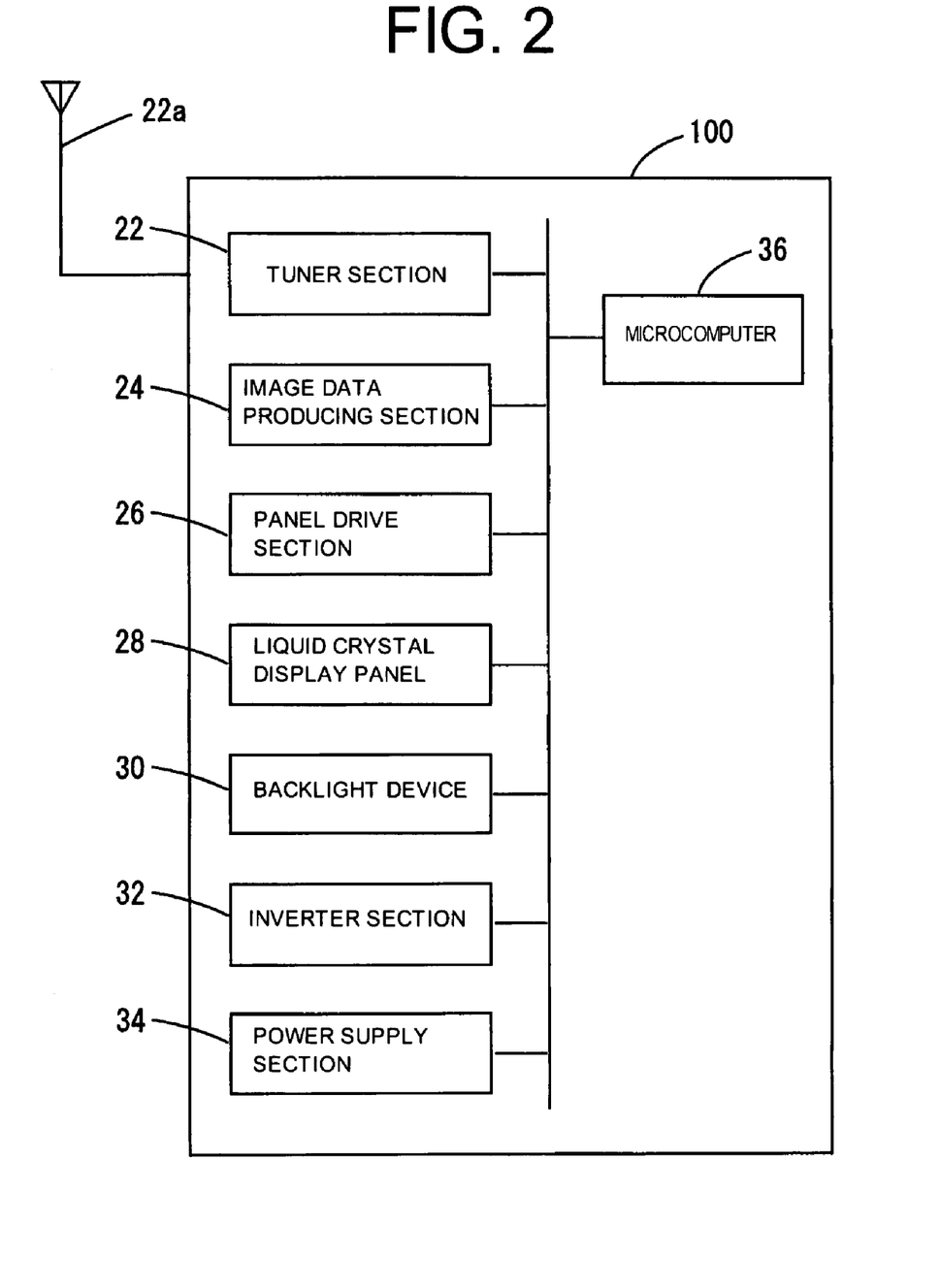
FIG. 2 is an exemplary illustration of a block diagram of a schematic structure of the liquid crystal television apparatus according to the embodiment of the present invention.

FIG. 2 is a block diagram illustrating a schematic structure of the television 100 according to the embodiment of the present invention. The television 100 generally includes a tuner section 22 connected to an antenna 22a, an image data producing section 24, a panel drive section 26, the liquid crystal panel 28, a power supply section 34, a microcomputer 36, an inverter section 32, and a backlight device 30. In the above-mentioned structure, the microcomputer 36 is electrically connected to the respective sections making up the television 100. A CPU which is one of components making up the microcomputer 36 is adapted to control the entire television 100 according to respective programs written in ROM and RAM which are also components of the microcomputer 36.

The tuner section 22 is adapted to receive a television broadcast through the antenna 22a according to the control by the microcomputer 36, extract an image signal as an intermediate frequency signal from a television broadcast signal while carrying out a predetermined signal amplification processing and the like, and output the image signal to the image data producing section 24. The image data producing section 24 is adapted to digitalize the inputted image signal according to a signal level thereof and, at the same time, perform matrix transform processing on the basis of a luminance signal and a color-difference signal which are extracted from the image signal, and produce an RGB (Red, Green, and Blue) signal as an image data.

When the RGB signal is inputted to the panel drive section 26 from the image data producing section 24, the panel drive section 26 is adapted to perform scaling process with respect to the RGB signal in such a manner to cause the RGB signal to match with the number of pixels (aspect ratio, m: n) of the liquid crystal display panel 28, and produce an image data for one screen to be displayed on the liquid crystal display panel 28. The produced image data is then outputted to the liquid crystal display panel 28, to thereby allow the liquid crystal display panel 28 to display an image based on the image data.

The power supply section 34 is adapted to receive a supply voltage (alternating current) from an external commercial power supply or the like, and supply the received supply voltage to the inverter section 32 and the like as well as the microcomputer 36. The power supply section 34 is also adapted to change the voltage supplied to the respective sections into a direct current from an alternating current, as occasion demands.

The inverter section 32 is adapted to change the direct current voltage, supplied from the power supply section 34, into an alternating current voltage, impress the voltage at the same time, supply the voltage to the backlight device 30, and cause the backlight to light up. The backlight device 30 is adapted to irradiate light on the liquid crystal display panel 28 from the back, utilizing fluorescent tubes such as cold-cathode tubes as a light source.

Figure 3:
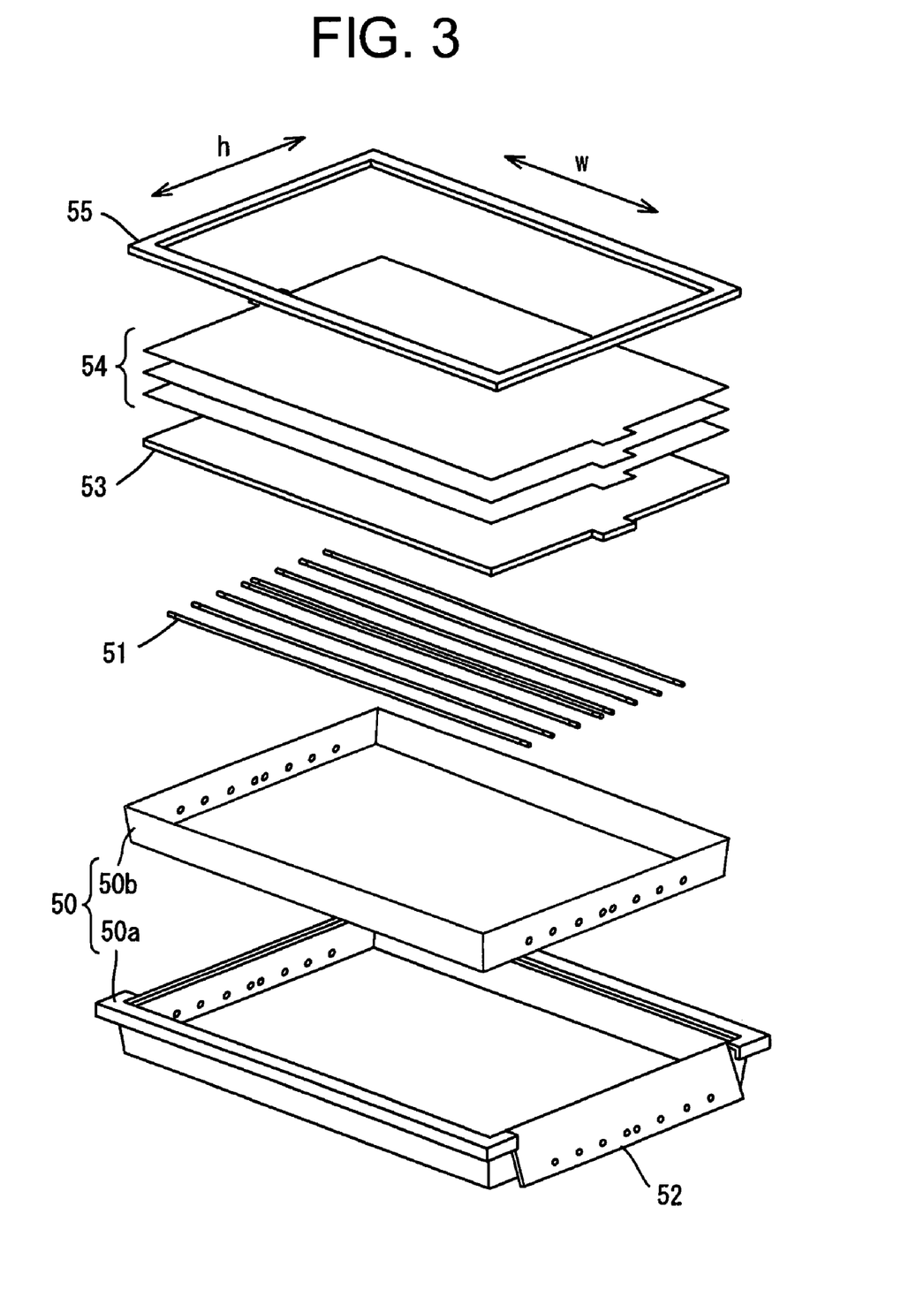
FIG. 3 is an exemplary illustration of a schematic exploded perspective view of a direct-type backlight device according to an embodiment of the present invention.

(2) Structure of a Direct-Type Backlight Device:

FIG. 3 is a schematic view illustrating the structure of the backlight device 30. In the illustrated example, the backlight device 30 is essentially comprised of a reflector plate 50, fluorescent tubes 51, a diffusion plate 53, lump holders 52, and a dimmer sheet 54.

The fluorescent tubes 51 are arranged substantially in parallel on the back of the diffusion plate 53 and fixed to the reflector plate 50 with portions adjacent both ends of the fluorescent tubes 51 being covered with the lump holders 52. The fluorescent tubes 51 are adapted to irradiate light upon the back of the diffusion plate 53.

The reflector plate 50 is comprised of a metallic frame 50a and a reflective sheet 50b laid on an inner surface of the metallic frame 50a. A plurality of the fluorescent tubes 51 are set on the reflective sheet 50b. The reflector plate 50 is arranged on the back sides of the fluorescent tubes 51 and adapted to reflect lights irradiated from the fluorescent tubes 51 toward the diffusion plate 58.

The diffusion plate 53 is arranged at the back of the liquid crystal display panel 28. Direct lights from the fluorescent tubes 51 and reflected light from the reflector plate 50 are irradiated upon the diffusion plate 53. The diffusion plate 53 is adapted to diffuse and irradiate the irradiated lights toward the liquid crystal display panel 28.

The dimmer sheet 54 is comprised of a plurality of functional sheets having a dimming function, such as lens sheets for causing the display screen to be brightened and diffusion sheets for diffusing light. The dimmer sheet 54 is adapted to dim the diffused light irradiated from the diffusion plate 53 and then irradiate the light upon the liquid crystal display panel 28.

Figure 4:
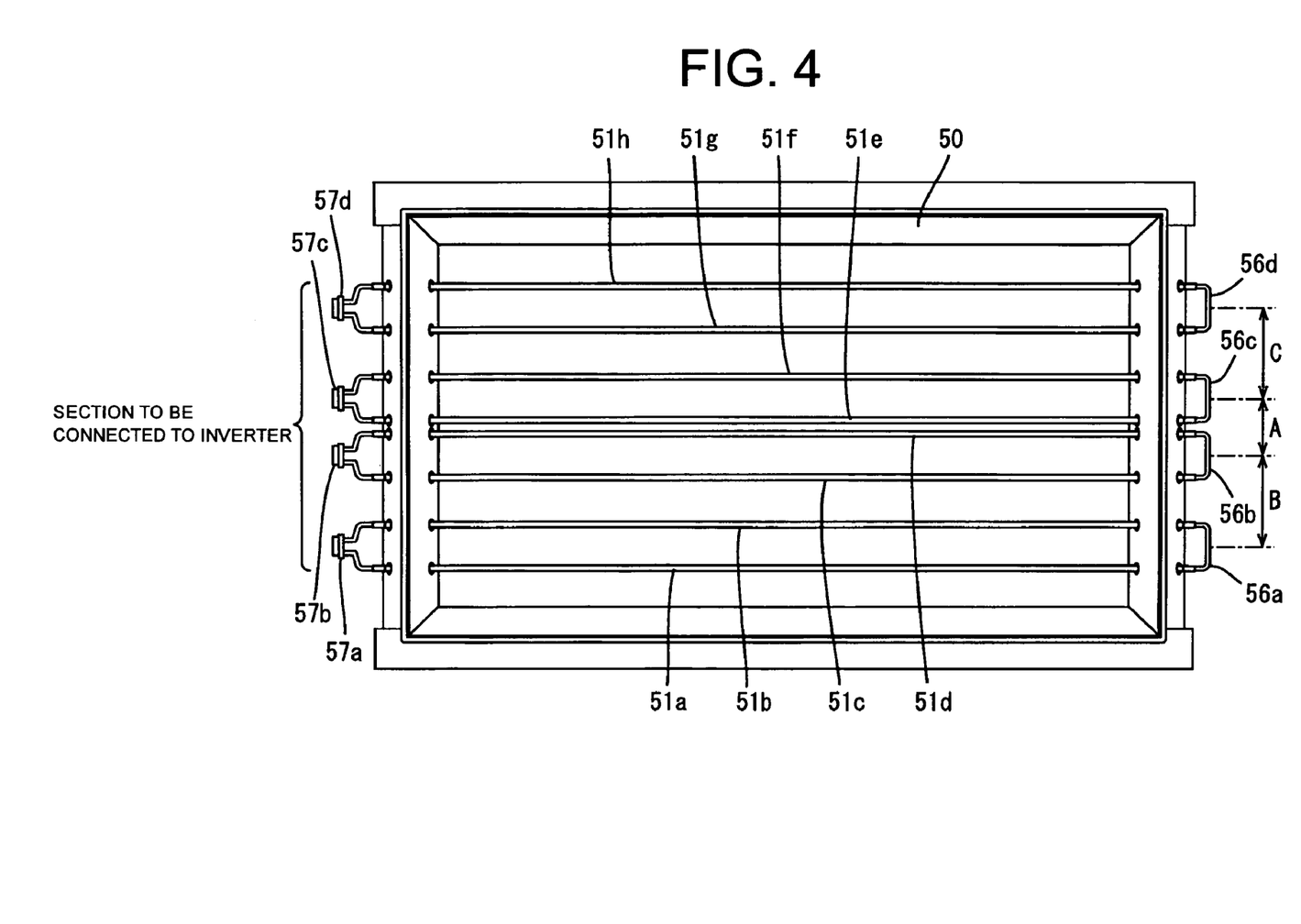
FIG. 4 is an exemplary illustration of a schematic front view illustrating an arrangement of fluorescent tubes employed in the direct-type backlight device according to the embodiment of the present invention.
Figure 5:
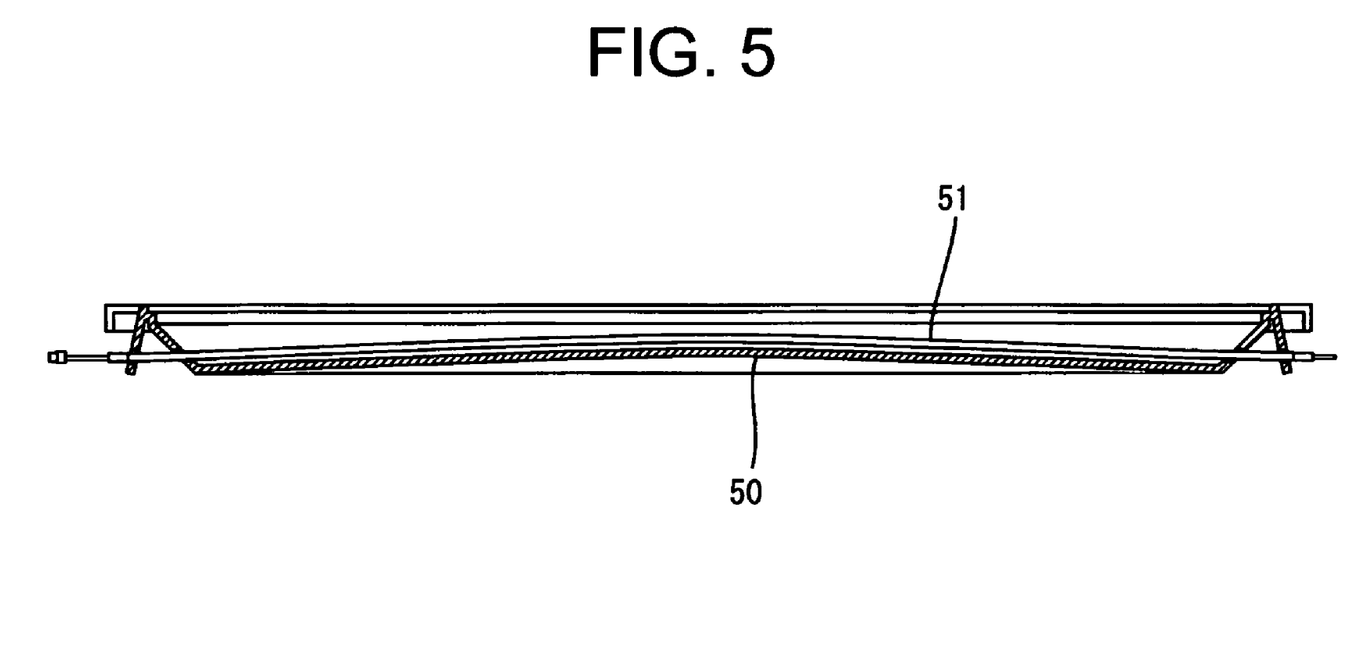
FIG. 5 is an exemplary illustration of a schematic sectional view of the arrangement of the fluorescent tubes in the direct-type backlight device according to the embodiment of the present invention.
Figure 6:
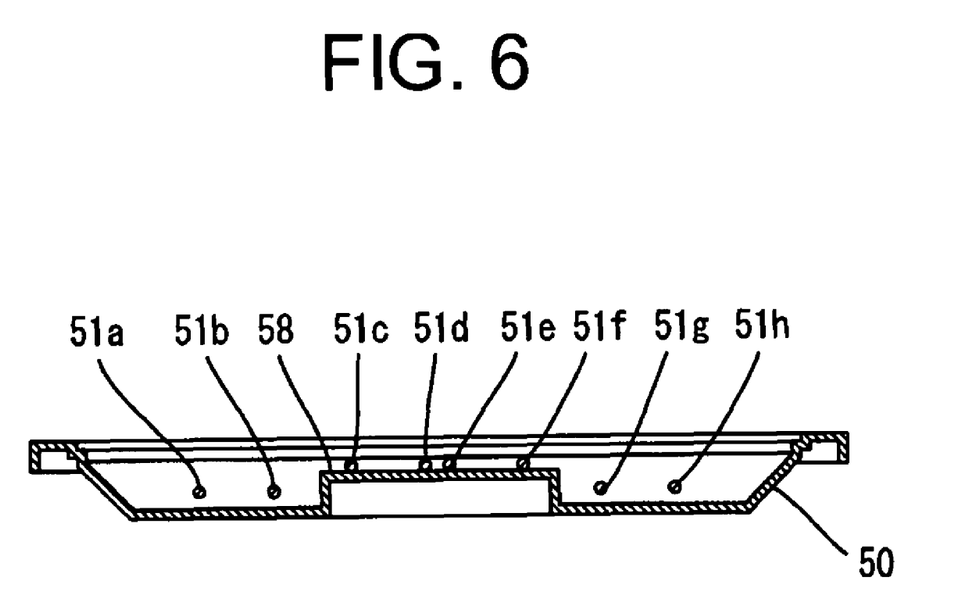
FIG. 6 is an exemplary illustration of a schematic sectional view of the arrangement of the fluorescent tubes in the direct-type backlight device according to the embodiment of the present invention.

FIGS. 4 to 6 fully illustrate the arrangement of the fluorescent tubes of the backlight device according to the embodiment of the present invention. FIG. 4 is a schematic front view of the arrangement of the fluorescent tubes in the direct-type backlight device. FIG. 5 is a schematic sectional view of the arrangement of the fluorescent tubes of the direct-type backlight device, taken along any one of the fluorescent tubes in left and right directions. FIG. 6 is a schematic sectional view of the arrangement of the fluorescent tubes, vertically taken at substantially central parts thereof as viewed from a front of a light emitting surface of the direct-type backlight device.

As shown in FIG. 5, a fluorescent tube 51 is bent into a chevron shape in such a manner that a substantially central portion of a longitudinal direction of the fluorescent tube becomes a crest which provides access to the diffusion plate 53. In short, the substantially central portion of the fluorescent tube 51 is bent so as to come closer to the display face of the liquid crystal display panel 28, as compared to end portions of the fluorescent tube 51. That is, light emitted from the substantially central portion of the fluorescent tube 51 arrives at the liquid crystal display panel 28 with a travel distance shorter than a travel distance of lights emitted from the end portions of the fluorescent tube 51 to the liquid crystal display panel 28. Therefore, the light emitted from the substantially central portion of the fluorescent tube 51 becomes higher in brightness than the lights emitted from the end portions of the fluorescent tube 51.

Moreover, it is desirable that fluorescent tubes which are bent into chevron shapes in such a manner that substantially central portions of the fluorescent tubes becomes crests are only fluorescent tubes which are arranged in the vicinity of a substantially central area of an arrangement direction of the fluorescent tubes, and fluorescent tubes which are arranged in the vicinity of outer edge areas of the arrangement direction of the fluorescent tubes are left straight. In short, in the example shown in FIG. 4, four fluorescent tubes 51c to 51f are bent into chevron shapes in such a manner that substantially central portions of the fluorescent tubes 51c to 51f become crests, and fluorescent tubes 51a, 51b, 51g, 51h are left straight. Of course, the fluorescent tubes which are bent into chevron shapes in such a manner that the substantially central portions of the fluorescent tubes become crests may be only two fluorescent tubes which are arranged in the vicinity of the central area of the arrangement direction of the fluorescent tubes, and other fluorescent tubes may be left straight. Thus, the fluorescent tubes located in the vicinity of the central area of the arrangement direction of the fluorescent tubes also come closer to the liquid crystal display panel 28 as compared to the fluorescent tubes located in the vicinity of the outer edge areas, thereby making it possible to cause only an area in the vicinity of a central area of the screen to be brightened.

Moreover, in addition to the fluorescent tubes 51 being bent, the reflector plate 50 may be also bent in such a manner to be raised up so as to match with the curvature of the bent fluorescent tubes. In short, the reflector plate 50 is formed so as to come closer to the display face of the liquid crystal display panel 28 at an area in the vicinity of a substantially central portion thereof which positionally corresponds to the substantially central portions of the longitudinal directions of the bent fluorescent tubes 51. That is, light reflected from the area in the vicinity of the substantially central portion of the reflector plate 50 arrives at the liquid crystal display panel 28 with a travel distance shorter than a travel distance of lights reflected from side portions of the reflector plate 50 to the liquid crystal display panel 28. Therefore, the light reflected from the area in the vicinity of the substantially central portion of the reflector plate 50 becomes higher in brightness than the lights reflected from the side portions of the reflector plate 50. As a manner to cause the reflector plate 50 to be bent, the reflector plate 50 may be raised up so as to become a gradually raised chevron or may be formed in a form of steps comprising a plurality of surfaces parallel to the face of the liquid crystal display panel 28.

As shown in FIG. 4, the fluorescent tubes 51a to 51h are arranged such that their arrangement distances gradually become wider from the substantially central area toward the edge areas. In short, a relationship among the arrangement distances is as follows: A>B=C, where A is a distance between a pseudo U-shaped tube constituted by the fluorescent tubes 51f, 51e and a pseudo U-shaped tube constituted by the fluorescent tubes 51c, 51d, C is a distance between a pseudo U-shaped tube constituted by the fluorescent tubes 51f, 51e and a pseudo U-shaped tube constituted by the fluorescent tubes 51g, 51h, and B is a distance between a pseudo U-shaped tube constituted by the fluorescent tubes 51c, 51d and a pseudo U-shaped tube constituted by the fluorescent tubes 51a, 51b.

Moreover, as shown in FIG. 6, the reflector plate 50 is formed with a protrusion 58 which allows the fluorescent tubes in the vicinity of the substantially central area of the arrangement direction of the fluorescent tubes 51a to 51h to be raised up so as to protrude toward the diffusion plate 53. In short, the reflector plate 50 is formed in such a manner that a portion of the reflector plate 50 which positionally corresponds to undersides of the fluorescent tubes 51c to 51f comes closer to the liquid crystal display panel 28, as compared to a portion of the reflector plate 50 which positionally corresponds to the backs of the fluorescent tubes 51a, 51b, 51g, 51h.

Of course, the fluorescent tubes to be raised up are not limited to the four fluorescent tubes 51c to 51f; the two fluorescent tubes 51d, 51e may be raised up, any one of the fluorescent tubes may be raised up or six fluorescent tubes may be raised up. Moreover, the way to cause the reflector plate 50 to be raised up is not limited to the form of two steps, and may be the form of three steps or four steps. As far as the side portions of the reflector plate 50 are lower than the central portion of the reflector plate 50, the number of steps may be optionally selected.

Incidentally, the reflector plate 50 may be raised up to a height of one third or less of a space, in which the fluorescent tubes 51a to 51h are installed, namely, a space defined by the reflector plate 50 and the diffusion plate 53. In short, if a distance from the reflector plate 50 to the diffusion plate 53 is $3x$, a distance from a surface of the reflector plate 50 to a surface of the protrusion 58 may be employed up to a maximum value x. Generally, $3x=34$-$35$ mm, so that up to about 10 mm may be employed as x. That is, the fluorescent tubes 51 and the liquid crystal display panel 28 are not excessively close to one another, so that horizontal stripes do not appear on areas of the liquid crystal display panel 28 which positionally correspond to the fluorescent tubes 51.

Moreover, as shown in FIG. 4, the fluorescent tubes 51a-51h are straight tubes in which respective two adjacent fluorescent tubes are connected at one ends thereof to each other by corresponding one of harnesses 56a-56d, thereby constituting pseudo U-shaped tubes. The other ends of the fluorescent tubes are connected to the inverter section 32, whereby an alternating current voltage is allowed to be supplied. Thus, terminals which are connected to connectors 57a to 57d are lined up along any one of left and right ends of the backlight device 30. Therefore, a substrate realizing the inverter section 32, and the like may be formed at only any one of the ends of the backlight device 30.

Moreover, the terminals which are connected through harnesses to the connectors 57a to 57d are collected at the one end of the backlight device 30, thus making it possible to avoid the flicker of the fluorescent tubes which is brought about by unevenness of lengths of the harnesses and excessively long lengths of the harnesses. Moreover, in a U-shaped tube, a bent portion becomes brightest, so that in such an arrangement as to be shown in FIG. 4, if the U-shaped tube is used, an end area which corresponds to a bent portion of the U-shaped tube becomes brightest. However, the U-shaped tube is not used and the pseudo U-shaped tube is used, thus allowing the central area to become brighter as compared to the end area. Moreover, the straight tubes are used, so that the unit costs of the fluorescent tubes are lowered, thus leading to reduction of cost.

It goes without saying that, even if the pseudo U-shaped tubes are not used and the U-shaped tubes are used as the fluorescent tubes, the object of the present invention can be attained. Moreover, it goes without saying that, even if a structure in which voltage is not supplied to the pseudo U-shaped tubes and is supplied to the both ends of the straight tubes by the inverter is employed, the object of the present invention can be achieved.

(3) Summary:

In short, the fluorescent tubes 51 are arranged such that their arrangement spaces gradually become wider from the substantially central area toward the edge areas. The fluorescent tubes 51 located in the vicinity of the substantially central area of the arrangement direction are bent into chevron-shapes such that the substantially central parts of the longitudinal directions of the fluorescent tubes become crests which provide access to the diffusion plate 53. The fluorescent tubes 51 located in the vicinity of the outer edge areas of the arrangement direction are left straight. The respective two adjacent fluorescent tubes 51 which are the straight tubes are connected to one another, thereby constituting the pseudo U-shaped tubes, and the alternating current voltage from the inverter section 32 is supplied through the terminals lined up along the one of the edge areas of the direct-type backlight device 30. The reflector plate 50 is bent so as to match with the curvature of the bent fluorescent tubes 51, and is formed with the protrusion which allows the fluorescent tubes located in the vicinity of the substantially central area of the arrangement direction to be raised up so as to protrude toward the diffusion plate 53.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A liquid crystal television apparatus for receiving a television broadcast and then allowing a corresponding image to be displayed on a screen, the liquid crystal television apparatus comprising:
a liquid crystal display panel for displaying the image through the screen of the liquid crystal display;
a direct-type backlight device including a diffusion plate arranged on a back of the liquid crystal display panel for irradiating diffused light upon the liquid crystal display panel, a plurality of cold-cathode tubes arranged substantially in parallel on a back of the diffusion plate for irradiating light upon the back of the diffusion plate, and a reflector plate arranged on backs of the cold-cathode tubes for reflecting the light from the cold-cathode tubes toward the diffusion plate; and
an inverter section for supplying an alternating current voltage to the direct-type backlight device,
the cold-cathode tubes are U-shaped tubes constituted by causing respective two adjacent straight-tubes to be connected at one ends thereof, and the other ends of the respective two adjacent straight-tubes are connected to the inverter section through terminals lined up along one edge of the direct-type backlight device, and are arranged such that their arrangement spaces become wide from a central area toward edge areas;
cold-cathode tubes arranged in central area of side by side direction of the cold-cathode tubes are bent into chevron-shapes such that central parts of longitudinal directions of the cold-cathode tubes become crests which is closer to the display surface of the liquid crystal display panel as compared to end parts of the longitudinal directions of the cold-cathode tubes;
cold-cathode tubes that are arranged in the outer edge areas of the side by side direction of the cold-cathode tubes are remained straight; and
the reflector plate is bent to match with a curvature of the bent cold-cathode tubes, and is formed with a protrusion that is raised up toward the diffusion plate in the central area of the side by side direction of the cold-cathode tubes, the protrusion is raised to a height of one third or less of a distance defined by the diffusion plate and the reflector plate.

2. A direct-type backlight device comprising:
a diffusion plate arranged on a back of a liquid crystal display panel for irradiating diffused light upon the liquid crystal display panel;
a plurality of fluorescent tubes arranged substantially in parallel on a back of the diffusion plate for irradiating light upon the back of the diffusion plate; and
a reflector plate arranged on backs of the fluorescent tubes for reflecting light from the fluorescent tubes toward the diffusion plate;
the fluorescent tubes arranged in a central area of side by side direction of the fluorescent tubes are bent into chevron-shapes such that central parts of longitudinal directions thereof become crests which is closer to the display surface of the liquid crystal display panel as compared to end parts of the longitudinal directions thereof, and fluorescent tubes which are arranged in outer edge areas of the side by side direction are remained straight.

3. The direct-type backlight device according to claim 2, wherein the reflector plate is bent to match with a curvature of the bent fluorescent tubes.

4. The direct-type backlight device according to claim 2, wherein the fluorescent tubes are arranged such that their arrangement spaces become wide from the central area toward the outer edge areas of side by side direction of the fluorescent tubes.

5. The direct-type backlight device according to claim 2, wherein the reflector plate is formed such that its central area in the side by side direction of the fluorescent tubes is raised toward the diffusion plate.

6. The direct-type backlight device according to claim 5, wherein the reflector plate is raised up to a height of one third or less of a space in which the fluorescent tubes are installed.

7. The direct-type backlight device according to claim 2, wherein the fluorescent tubes are straight tubes.

8. The direct-type backlight device according to claim 2, wherein the fluorescent tubes are U-shaped tubes.

9. The direct-type backlight device according to claim 2, wherein the fluorescent tubes are U-shaped tubes constituted by causing respective two adjacent straight-tubes to be connected to each other.

10. The direct-type backlight device according to claim 2, wherein the reflector plate is formed such that its part in the central area of the side by side direction of the fluorescent tubes is raised toward the diffusion plate in the form of steps comprising a plurality of surfaces parallel to the surface of the liquid crystal display panels.

* * * * *